Patented Mar. 12, 1929.

1,705,090

UNITED STATES PATENT OFFICE.

GUSTAVE KLINKENSTEIN, OF NEWARK, AND GUSTAVE D. MAGNUS, OF EAST ORANGE, NEW JERSEY, ASSIGNORS TO MAAS & WALDSTEIN CO., OF NEWARK, NEW JERSEY, A CORPORATION OF NEW JERSEY.

METHOD OF IMPREGNATING COMPOSITION BOARD.

No Drawing.   Application filed May 6, 1927. Serial No. 189,452.

This invention relates generally to a novel method of applying impregnating material; and the invention has reference more particularly to a novel method especially suitable for impregnating with a desired compound or substance composition board made of various kinds of material such as concrete, asbestos, wood fibre, plaster, etc.

The invention has for its principal object to provide a novel method of impregnating composition board with material for the purpose of filling the pores and internal interstices of said material, thus serving to both impregnate the body and coat the surfaces thereof with an impermeable water and alkali resisting material and whereby at the same time the said board is rendered lacquer resisting.

The invention has for a further object to so prepare composition board, such as is commonly used in building operations, by impregnating the same with the novel impregnating compound so that an impermeable lacquer resisting mass is produced from the initially porous composition board, and whereby not only is the board rendered impervious to water but the necessity for finishing such board with the usual sealer coat, primer coat, top coat, etc. is eliminated, while nevertheless providing such board with the desired lacquer resisting qualities.

Other objects of this invention not at this time more particularly enumerated will be clearly understood from the following detailed description of the same.

The preferred impregnating compound consists basicly in a mixture of China wood oil, linseed oil, turpentine and heavy naphtha. The ingredients of this basic composition are combined in substantially the following proportions to wit,

|  | Per cent |
| --- | --- |
| China wood oil | 13 |
| Linseed oil | 25 |
| Turpentine | 4 |
| Heavy naphtha | 58 |

When mixed in such proportions the basic impregnating compound is found to be very efficient and adapted, especially when hot, to readily penetrate the pores or interstices of the composition board to which it is to be applied. It will be understood, however, that we do not necessarily limit ourselves to the exact proportions above named, since some variation of the relative proportions within reasonable limits may be made.

In connection with the basic impregnating compound above set forth it is desirable before using the same to impregnate composition board, to add thereto a small quantity of a mixed drier. The desirable proportion of drier to basic impregnating compound is 5 ounces of the drier to each gallon of compound. As an example of a mixed drier suitable for use in connection with the compound may be cited a mixture of rosin, manganese borate, manganese oxide, litharge, red lead and cobalt linoleate.

The application of the impregnating compound to composition board is carried on by the following novel method or process.

The board to be impregnated is first heated for a period of 4 to 5 hours at 65° C. This heating operation may be carried on in a suitable drying kiln or oven or any other suitable form of drying room. The step of thus heating the composition board operates to remove therefrom any residual moisture, while at the same time by expansion expelling air from the pores or interstices of the same.

After the composition board has been heated and thus thoroughly dried the same is removed from the drying room and is immediately immersed, while still hot, in the impregnating compound above described and allowed to remain so immersed in said compound for a period of from 12 to 14 hours. This impregnation operation or step may be carried out in the following manner:

Suitable vats are provided having means to maintain the content thereof at desired temperature and said vats are supplied with the novel impregnating compound which is in liquid solution, the said compound being heated and maintained at a temperature of 80 to 90° C. When the composition board is immersed in the hot compound the latter will enter into and permeate the pores or interstices thereof so that at the end of from 12 to 14 hours of immersion and at a temperature of 80 to 90° C. the body of the composition board will be completely impregnated throughout its mass with the compound which will fill all the pores or interstices thereof and will as well coat the surfaces of the same.

After the above described impregnating step, the impregnated board is again submitted to a baking step. To this end the board is removed from the impregnating vats and drained, whereupon it is deposited in a suitably heated kiln or oven and baked for a period of approximately four hours at a temperature of 145° C.

It will be understood that we do not limit ourselves to the exact time of drying, immersing or baking periods above named, or to the exact temperatures at which said steps are carried on, since it will be obvious that longer time periods under lower temperatures, or within reasonable limits shorter time periods under higher temperatures, may be effectively employed, although we find the time periods and temperatures above stated to be preferable.

In the novel compound thus applied to porous composition board, the China wood oil and the linseed oil are the principal filling materials. That is, these ingredients tend to solidify or form a resinous mass, under relatively high temperature, in the pores or interstices of the board. The heavy naphtha serves as the principal vehicle or carrier for filling ingredients, and the turpentine serves initially as a solvent or carrier, but on baking also furnishes a resinous residue combining with the other filling materials. The heavy naphtha and the volatile elements of the turpentine evaporate during the baking step of the process. The function of the mixed drier is to accelerate the resinous formation during the baking step, and also to contribute its solids to the resultant resinous mass.

At the end of the baking period the impregnating compound will have become solidified into a resinous mass filling the pores or interstices of the composition, and thereupon the composition board is ready for use and provides a mass which is, due to the presence of the impregnating compound, impermeable and is water and alkali resisting. Due to the fact that the impregnating compound not only fills the pores but also coats the surfaces of the composition board it is not necessary to provide the latter with the usual sealer coat for the back of the board, or with the usual primer coat for the face of the board, since the impregnating compound converts the entire body of the board into one solid impermeable mass. The composition board treated with the above described novel impregnating compound, and by the novel method also above described, may be cut, sawed, drilled, nailed or subjected to any other shaping or tooling operation necessary to fit the same for installation in a building structure. Since the entire body of the board is impregnated with the novel compound, sawing or drilling of the board does not leave any raw edges through which water may seep or penetrate and consequently tendency to cause damage to the ultimate surface finish applied to the board such as blistering or peeling, due to the presence of moisture, is entirely prevented.

The impregnated composition board is adapted to receive any kind of surface finish which may be desired, but is especially adapted to receive and hold one or more coats of pyroxylin surfacers, sprayed, brushed, machine coated, or otherwise applied.

If desired, applications of one or more coats of pyroxylin enamel may be made upon the impregnated board surfaces, and such enamel finish after drying may be buffed, polished or hot-plated, by hand or machine, to a high gloss. Should a tile effect be desired to be obtained on the surface of the board, such surface may be scored into rectangular sections or squares without necessity of applying a top coat lacquer to waterproof the same, since the impregnation process has made the entire body of the board impervious to water.

It will be understood from the above description of the instant invention that composition board impregnated with the novel impregnating compound and by the novel method above described is very durable, and will not easily warp or swell or be otherwise distorted by exposure to dampness or wide variations of temperature.

With respect to the novel method of impregnating composition board, it will be understood that the method in its broader aspects may be carried out to impregnate the board with raw linseed oil, boiled linseed oil, or China wood oil, singly or in desired combinations with or without the addition of resins.

We claim:—

1. A method of impregnating composition board bodies to render the same impervious to water and lacquer resisting, comprising, first heating the board to remove residual moisture and to expel air from the interstices thereof by expansion; second, immersing the board while hot in a heated impregnating compound; and, third, removing the board from the impregnating compound and then baking the same under relatively high temperature.

2. A method of impregnating porous composition board bodies to render the same impervious to water and lacquer resisting, comprising, first, heating the board to remove residual moisture and to expel air from the interstices thereof by expansion; second, immersing the board while hot in an impregnating compound comprising a hot mixture of China wood oil, linseed oil, turpentine and heavy naphtha until the compound thoroughly penetrates the pores thereof; and, finally, removing the board from the impregnating compound and then baking the same under relatively high temperature.

3. A method of impregnating porous composition board bodies to render the same impervious to water and lacquer resisting, comprising, first, heating the board to remove residual moisture and to expel air from the interstices thereof by expansion; second, immersing the board while hot in an impregnating compound comprising a mixture of China wood oil, linseed oil, turpentine and heavy naphtha heated to approximately 80 to 90 degrees C., allowing the board to remain thus immersed for a period of 12 to 14 hours; and finally, removing the board from the impregnating compound and then baking the same for a period approximating 4 hours under a temperature of approximately 145° C.

In testimony, that we claim the invention set forth above we have hereunto set our hands this 3rd day of May, 1927.

GUSTAVE KLINKENSTEIN.
GUSTAVE D. MAGNUS.